United States Patent [19]
Nikles

[15] 3,678,074
[45] July 18, 1972

[54] PROCESS FOR THE MANUFACTURE OF OXIMINO-DITHIOLANES

[72] Inventor: Erwin Nikles, Liestal, Switzerland
[73] Assignee: Ciba-Geigy AG, Basel, Switzerland
[22] Filed: Feb. 24, 1970
[21] Appl. No.: 13,764

[30] Foreign Application Priority Data

Feb. 27, 1969 Switzerland ..........................2966/69

[52] U.S. Cl..............................260/327 M, 71/90, 424/277
[51] Int. Cl. .........................................................C07d 71/00
[58] Field of Search.............................................260/327 M

[56] References Cited
UNITED STATES PATENTS 3,484,455  12/1969  Addor....................................260/327

Primary Examiner—Henry R. Jiles
Assistant Examiner—Cecilia M. Shurko
Attorney—Harry Goldsmith, Joseph G. Kolodny and Mario A. Monaco

[57] ABSTRACT

The invention provides a new cyclization reaction to obtain 4-alkenyl-2-oximino-1,3-dithiolanes by reacting a trans-or cis-1,4-dihalogeno-2-butene with a salt of a dithiocarbamic acid and further reacting the resulting intermediate product 4-alkenyl-2-imino-1,3-dithiolane in the usual way with hydroxylamine.

8 Claims, No Drawings

PROCESS FOR THE MANUFACTURE OF OXIMINO-DITHIOLANES

The present invention provides a process for the manufacture of 4-alkenyl-2-oximino-1,3-dithiolanes of the general formula

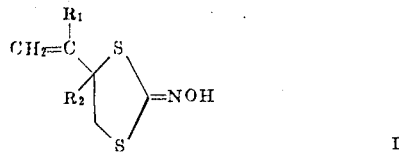

in which $R_1$ and $R_2$ each represents a hydrogen atom or an alkyl group, preferably a lower alkyl group, $R_1$ and $R_2$ being the same or different, wherein a trans or cis-1,4-dihalogeno-2-butene of the general formula

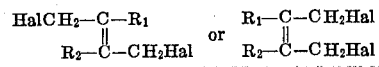

in which "Hal" represents a halogen atom, is cyclized with a salt of a dithiocarbamic acid of the general formula

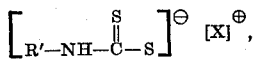

in which R' represents a hydrogen atom or any aliphatic or aromatic radical bound by way of a carbon atom and X represents a cation, to obtain a compound of the general formula

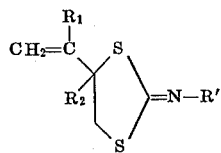

which is reacted with hydroxylamine to form the oxime thereof.

Preferably R' represents a lower alkyl group. The term "Hal" refers especially to a chlorine or a bromine atom, preferably a chlorine atom. The term "lower alkyl group" refers to $CH_3$, $C_2H_5$, n-$C_3H_7$, iso-$C_3H_7$, n-$C_4H_9$ and iso-$C_4H_9$.

The reaction temperatures may be varied within a very wide range. The preferred range is from 20° to 100° C. The reaction may be carried out in the presence of a diluent.

The process of the invention is advantageous in that the starting material is easily obtainable and high yields are obtained in a clear, straightforward reaction.

Since the compounds can also be cyclized in a manner known per se using a 1,2-dihalogeno-3-butene as starting material, a high degree of technical efficiency is possible in that, for example, technical dichlorobutene mixtures obtained by the chlorination of butadiene can be used directly for the cyclization process and the desired compound is obtained as the sole end-product.

The compounds of Formula I and the derivatives thereof may be used for a wide variety of purposes; for example, they may be used in the processing of rubber, as intermediate products in the synthesis of medicaments and as intermediate products for obtaining pesticidal dithiolanyl-oximinocarbamates by reacting them with alkylisocyanates. 1,3-Dithiolanyl-oximinocarbamates of the general formula II

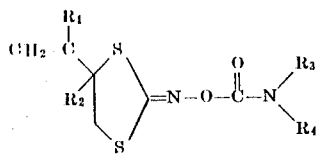

are obtained by reacting the oximino-dithiolane compounds of formula I with an isocyanate $R_3$—NCO, in which $R_3$ represents hydrogen or a lower alkyl group and $R_4$ represents hydrogen, or by reacting the oximino-dithiolane compounds of formula I with a carbamic acid halide of the formula hal—CO—N($R_3$)($R_4$) in which $R_3$ represents hydrogen or a methyl group and $R_4$ represents a lower alkyl group. In the compound of the general formula II, $R_1$ and $R_2$ each represents a hydrogen atom or a lower alkyl group. The term "lower alkyl group" as used here is a $CH_3$, $C_2H_5$, n-$C_3H_7$, iso-$C_3H_7$, n-$C_4H_9$, secondary $C_4H_9$, iso-$C_4H_9$, tertiary $C_4H_9$, n-$C_5H_{11}$, iso-$C_5H_{11}$, or secondary $C_5H_{11}$ group.

The compounds of formula II have a surprising range of biological activity as is observed either in the far-reaching control of pests or when used in the form of herbicides in areas of cultivated plants where they have a favorable effecton the useful plants.

As carriers there may be used, for example, solvents, diluents, dispersants, emulsifiers, wetting agents, adhesives, binders or thickening agents.

The compounds of the formula II also act as molluscicides, especially against gastropodes which are schistosome carriers. Furthermore, when applied in very small amounts the new compounds display a good microbicidal activity against bacteria and fungi, especially against phytopathogenic fungi, for example, *Erysiphe cichoracearum*, *Alternaria tenuis* and *solani*. In the concentrations required for this use no damage to the plants can be detected.

Furthermore, the compounds of the formula II act against nematodes, for example, *Panagrellus redivivus*, *Meloidogne sp.* and others, and have also a very good insecticidal and acaricidal activity which is distinguished biologically in a distinct manner by chemosterilizing properties.

Thus, for example, these carbamates act strongly against houseflies, aphids, caterpillars and beetles, for example, cornweevil and Colorado beetle. Their contact effect surpasses substantially that of the known active substance "Carbaryl" (N-methyl-α-naphthyl-carbamate).

Their activity against *Phyllodromia germanica*, *Periplaneta americana*, *Blatta orientalis*, *Acheta domestica* and *Rhodnius prolixus* is especially strong.

The new carbamates are, therefore, very suitable for controlling pests in the hygiene sector and in protecting stored products.

Their activity against Diptera, Coleoptera, Rhynchoti and Lepidoptera makes them an especially suitable type of compound. Soil insects can be controlled in the soil with very small amounts.

It should be specially mentioned that known rice pests, for example, *Nephotettix cincticeps*, *Nilaparvata lugens*, *Sogatella fureifera* or the rice stem borer *Chilo suppressalis*, and cotton pests, for example, *Prodenia* or *Anthonomus*, can all be effectively controlled.

The toxicity of the compounds of the formula II towards warm-blooded beings is 10 to 20 times lower than that of 1,3-dithiolanyl-oximino-N-methylcarbamate. They undergo decomposition in the soil and no residues remain in the cultivated soil for a long time.

The following Example illustrates the invention, the parts being by weight unless otherwise indicated.

EXAMPLE

2-Isopropylimino-4-vinyl-1,3-dithiolane

194 Parts of isopropylammoniumisopropyldithiocarbamate are introduced at 30° to 35° C, while stirring, into a mixture comprising 165 parts of potassium carbonate, 125 parts of cis-1,4-dichloro-2-butene and 1,500 parts by volume of anhydrous alcohol. The suspension is then refluxed for 14 hours, cooled to room temperature and filtered. The filtrate is evaporated, taken up in 100 parts by volume of a 1:1 mixture of benzene and cyclohexane, filtered and evaporated. The residue is distilled in a high vacuum. B.p. = 106°–112° C/0.025 mm Hg.

The same product is also obtained when the cis-1,4-dichloro-2-butene is replaced by the corresponding trans-isomer.

2-Oximino-4-vinyl-1,3-dithiolane 38.5 Parts of 2-isopropylimino-4-vinyl-1,3-dithiolane are mixed with 100 parts by volume of alcohol and then 16 parts of hydroxylamine hydrochloride, dissolved in 30 parts of water, are added. The mixture is refluxed for 5 hours, poured on to 2,000 parts of ice-water and then dissolved in ether. The ethereal solution is extracted with an N-sodium hydroxide solution. The alkaline extract is rendered neutral with concentrated hydrochloric acid while cooling with ice, and then extracted with chloroform. The chloroform solution is dried over anhydrous sodium sulphate, filtered and evaporated. The product remains behind in the form of an oil.

NMR - spectrum: δ-values [(DCl$_3$/TMS]

$m = 3.0 - 3.8$ (2H) (—CH$_2$-S—)
$m = 4.2 - 4.7$ (1H) (—CH—S—)
$m = 5.1 - 6.3$ (3H) (CH$_2$ = CH-)
$b = 9.1$ (1H) (—OH).

I claim:

1. A process for the manufacture of 4-alkenyl-2-oximino-1,3-dithiolanes of the general formula

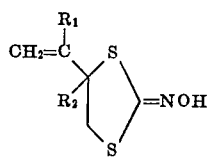

in which R$_1$ and R$_2$ each represents a hydrogen atom or a lower alkyl group, R$_1$ and R$_2$ being the same or different, wherein a trans or cis-1,4-dihalogeno-2-butene of the general formula

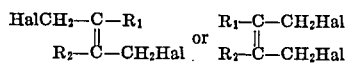

in which "Hal" represents a halogen atom, is cyclized with a salt of a dithiocarbamic acid of the general formula

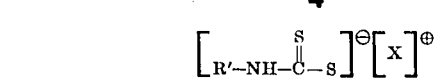

in which R' represents a hydrogen atom or any aliphatic or aromatic radical bound by way of a carbon atom and X represents a monovalent cation, to obtain a compound of the general formula

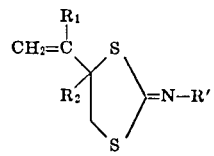

which is reacted with hydroxylamine to form the oxime thereof.

2. A process according to claim 1, wherein "Hal" represents a chlorine atom.

3. A process according to claim 1, wherein trans or cis-1,4-dichloro-2-butene is used.

4. A process according to claim 1, wherein R' represents a lower alkyl group.

5. A process according to claim 1, wherein as salt of a dithiocarbamic acid, a compound of the general formula

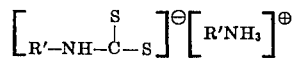

in which R' represents a hydrogen atom or a lower alkyl group, is used.

6. A process according to claim 1, wherein the reactions are carried out at a temperature of from 20° to 100°C.

7. A process according to claim 1, wherein the reactions are carried out in the presence of a diluent.

8. The compound of the formula

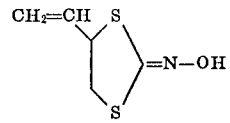

* * * * *